United States Patent
Izumi et al.

(10) Patent No.: US 10,252,248 B2
(45) Date of Patent: Apr. 9, 2019

(54) TRANSITION METAL OXIDE-CONTAINING CERIUM DIOXIDE PARTICLES

(71) Applicant: NGK INSULATORS, LTD., Nagoya (JP)

(72) Inventors: Yunie Izumi, Nagoya (JP); Kenji Morimoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/461,795

(22) Filed: Mar. 17, 2017

(65) Prior Publication Data

US 2017/0304808 A1 Oct. 26, 2017

(30) Foreign Application Priority Data

Mar. 30, 2016 (JP) ................. 2016-068420
Aug. 25, 2016 (JP) ................. 2016-165006

(51) Int. Cl.
*B01J 23/10* (2006.01)
*B01J 23/889* (2006.01)
(Continued)

(52) U.S. Cl.
CPC ...... *B01J 23/8892* (2013.01); *B01D 53/9413* (2013.01); *B01J 23/10* (2013.01); *B01J 35/0006* (2013.01); *B01J 35/026* (2013.01); *B01J 37/0221* (2013.01); *B01J 37/082* (2013.01); *F01N 3/035* (2013.01); *F01N 3/103* (2013.01); *F01N 3/2066* (2013.01); *B01D 2255/2065* (2013.01); *B01D 2255/2073* (2013.01);
(Continued)

(58) Field of Classification Search
CPC .. B01J 23/8892; B01J 37/082; B01J 35/0006; B01J 23/10; B01J 35/026; B01J 37/0221; F01N 3/035; F01N 3/2066; F01N 3/103; F01N 2370/02; B01D 53/9413; B01D 2255/2073; B01D 2255/65; B01D 2255/2065; B01D 2255/20738
USPC .......................................... 502/304
See application file for complete search history.

(56) References Cited

U.S. PATENT DOCUMENTS 5,976,476 A * 11/1999 Blanchard ............ B01D 53/945
423/213.2
6,701,707 B1  3/2004 Upadhyay et al.
(Continued)

FOREIGN PATENT DOCUMENTS

JP   H05-195756 A   8/1993
JP   2004-100699 A  4/2004
(Continued)

OTHER PUBLICATIONS

German Office Action, German Application No. 10 2017 002 875.3, dated Mar. 2, 2018 (5 pages).

*Primary Examiner* — Haytham Soliman
(74) *Attorney, Agent, or Firm* — Burr & Brown, PLLC

(57) ABSTRACT

The oxide-containing particles (transition metal oxide-containing cerium dioxide particle) exert a catalyst performance, and include at least an iron oxide containing an iron component and a manganese oxide containing a manganese component on a surface of each of cerium dioxide particles, wherein the iron oxide and manganese oxide have smaller particle diameters than that of the cerium dioxide particles, and the content rate of the iron oxide and the manganese oxide is within the range of from 15.0% by mass to 35.0% by mass.

6 Claims, 3 Drawing Sheets

(51) Int. Cl.
- *B01D 53/94* (2006.01)
- *B01J 35/00* (2006.01)
- *B01J 35/02* (2006.01)
- *B01J 37/02* (2006.01)
- *B01J 37/08* (2006.01)
- *F01N 3/035* (2006.01)
- *F01N 3/10* (2006.01)
- *F01N 3/20* (2006.01)

(52) U.S. Cl.
CPC ........... *B01D 2255/20738* (2013.01); *B01D 2255/65* (2013.01); *F01N 2370/02* (2013.01); *F01N 2510/06* (2013.01)

(56) References Cited

U.S. PATENT DOCUMENTS

| | | | |
|---|---|---|---|
| 2004/0040284 A1 | 3/2004 | Upadhyay et al. | |
| 2006/0156709 A1* | 7/2006 | Twigg | B01D 53/945 60/278 |
| 2010/0263357 A1 | 10/2010 | Lindner et al. | |
| 2014/0271425 A1* | 9/2014 | Nazarpoor | B01D 53/944 423/213.2 |

FOREIGN PATENT DOCUMENTS

| | | |
|---|---|---|
| JP | 2006-346605 A | 12/2006 |
| JP | 2008-302355 A | 12/2008 |
| JP | 2014-057951 A | 4/2014 |
| WO | 2008/000449 A2 | 1/2008 |

* cited by examiner

TRANSITION METAL OXIDE-CONTAINING CERIUM DIOXIDE PARTICLES

"The present application is an application based on JP-2016-068420 filed on Mar. 30, 2016 and JP-2016-165006 filed on Aug. 25, 2016 with Japan Patent Office, the entire contents of which are incorporated herein by reference."

BACKGROUND OF THE INVENTION

Field of the Invention

The present invention relates to transition metal oxide-containing cerium dioxide particles. More specifically, the present invention relates to transition metal oxide-containing cerium dioxide particles (hereinafter simply referred to as "oxide-containing particles") that exert a catalyst performance by which nitrogen oxide and the like can be purified without increasing the use amount of any precious metal catalyst.

Description of the Related Art

In recent years, plural filters for purification are disposed in the midstream of an exhaust gas pathway of an internal-combustion engine such as a diesel engine for the purpose of a purification treatment of exhaust gas emitted from said engine. For example, a diesel particulate filter (DPF) is used for a purification treatment of exhaust gas from a diesel engine. Furthermore, in accordance with further tightening of the regulations in the emission standard of exhaust gas, a selective catalytic reduction (SCR) catalyst converter using an SCR catalyst having a function to selectively reduce components to be purified in exhaust gas by a reduction reaction, and the like are installed in the downstream position of the above-mentioned DPF (see FIG. 4).

DPF has a function to trap particulate matters (PM) such as soot, which are mainly present in the exhaust gas, by a porous honeycomb structure to thereby prevent said particulate matters from being released as they are into the air. On the other hand, an SCR catalyst converter can reduce nitrogen oxides ($NO_x$) in the exhaust gas into nitrogen gas and water by utilizing ammonia ($NH_3$) generated by the decomposition of urea injected from a urea injector disposed at the upper stream side of an exhaust gas pathway.

In the above-mentioned DPF, a metal catalyst containing a precious metal is loaded by generally a honeycomb structure made of a ceramic so as to remove carbon oxide (CO) and hydrocarbon (HC) by oxidation. Therefore, it is necessary to carry out a combustion regeneration treatment for removing soot deposited in the honeycomb structure by purifying exhaust gas by means of combustion. At this time, the combustion of the soot is promoted by the loaded catalyst.

On the other hand, in a urea SCR system, it is known that it is preferable to set the ratio of nitrogen monoxide (NO) to nitrogen dioxide ($NO_2$) that flow into an SCR catalyst converter to 1:1 so as to decompose nitrogen oxides into nitrogen gas and water, in view of reaction rate. However, in a DPF constituted by a diesel oxidation catalyst (DOC) and a catalyzed soot filter (CSF) (see FIG. 4) positioned upstream of an SCR catalyst converter, nitrogen dioxide ($NO_2$) is consumed for combusting particulate matters (PM). Therefore, the amount of the nitrogen monoxide (NO) in the gas emitted from the DPF and introduced in the SCR catalyst converter is considerably larger than the amount of the nitrogen dioxide ($NO_2$). Therefore, the above-mentioned preferable ratio cannot be maintained, and thus there is a possibility that the purification efficiency of nitrogen oxide ($NO_x$) is decreased.

Therefore, an attempt to bring a ratio of nitrogen monoxide to nitrogen dioxide in gas to be introduced in an SCR catalyst converter closer to a preferable ratio of 1:1 is executed. At this time, in order to set the ratio of the nitrogen monoxide to the nitrogen dioxide to 1:1, a part of the nitrogen monoxide is converted to nitrogen dioxide by oxidization by loading a precious metal catalyst such as platinum on a CSF in a subsequent stage of a DPF. However, since a precious metal catalyst such as platinum is expensive, it is highly possible that the costs for the entirety of the DPF increase. In addition, there is also a problem that, since a precious metal catalyst has strong oxidation power, it is difficult to adjust the ratio of nitrogen monoxide to nitrogen dioxide to a suitable ratio of 1:1.

In addition, in patent applications relating to a whole exhaust gas purification system, systems using cobalt monoxide (CoO), manganese dioxide ($MnO_2$) or zirconium monoxide (ZrO) as an oxidation catalyst at a preceding stage of an SCR catalyst converter are shown (see Patent Documents 1 to 3 and the like). Furthermore, a catalyst-carrying honeycomb using an oxide catalyst (see Patent Document 4) or an exhaust gas purification device having a catalyst for purifying nitrogen oxides (see Patent Document 5) has been already disclosed.

[Patent Document 1] JP-A-2004-100699
[Patent Document 2] JP-A-5-195756
[Patent Document 3] JP-A-2014-57951
[Patent Document 4] JP-A-2008-302355
[Patent Document 5] JP-A-2006-346605

SUMMARY OF THE INVENTION

In Patent Document 2, since CoO is not stable at less than 800° C., the stability of CoO in the exhaust gas at a low temperature is concerned. Furthermore, since $MnO_2$ is decomposed to dimanganese trioxide ($Mn_2O_3$) at 550° C. or more, the stability of $MnO_2$ in the exhaust gas at a high temperature is concerned.

Patent Document 3 aims at increasing an action to combust soot to thereby suppress the amount of soot that deposits on a cell wall over time to be low. Therefore, the catalyst is fine, and thus does not sufficiently function for promoting a reaction between nitrogen monoxide and nitrogen dioxide in an SCR catalyst converter. Since the catalyst is fine, sintering proceeds easily, and thus there is a problem in durability. In Patent Document 4, the porosity is very high so as to achieve low pressure loss and high efficiency to trap PMs, and thus there is a problem in strength. Patent Document 5 is a technique in which the loading amount of the catalyst is much, and the purification is carried out by reducing nitrogen oxides.

Therefore, in view of the above-mentioned actual situations, the problem of the present invention is to provide oxide-containing particles, as a catalyst which can promote a reaction between nitrogen monoxide and nitrogen dioxide in an SCR catalyst converter to thereby increase a purification efficiency, and can decrease a use amount of a precious metal catalyst and suppress the increase in costs for a purification system or a purification device, and which exerts a high catalyst performance.

Specifically, the problem of the present invention is to provide oxide-containing particles which can be used in various embodiments as a part of raw materials such as a sealing material, a bonding material and a circumferential coat material, other than use as a part of raw materials for a surface trap layer formed on a partition wall surface of a honeycomb structure as in conventional use.

In order to solve the above-mentioned problem, according to the present invention, the following oxide-containing particles (transition metal oxide-containing cerium dioxide particles) are provided.

According to a first aspect of the present invention, a transition metal oxide-containing cerium dioxide particles having a transition metal oxide is provided containing at least an iron component and a manganese component on the surface and/or inside of the cerium dioxide particle.

According to a second aspect of the present invention, the transition metal oxide-containing cerium dioxide particles according to the first aspect is provided, wherein the transition metal oxide has a smaller particle diameter than the particle diameter of the cerium dioxide particles.

According to a third aspect of the present invention, the transition metal oxide-containing cerium dioxide particles according to the first or second aspects is provided, wherein the content rate of the transition metal oxide is in the range of from 15.0% by mass to 35.0% by mass.

According to a fourth aspect of the present invention, the transition metal oxide-containing cerium dioxide particles according to any one of the first to third aspects is provided, wherein the transition metal oxide is solutionized on the surfaces and/or inside of the cerium dioxide particles.

According to a fifth aspect of the present invention, the transition metal oxide-containing cerium dioxide particles according to any one of the first to fourth aspects is provided, wherein the molar ratio of the iron component to the manganese component (Fe/Mn ratio) in the transition metal oxide is in the range of from 0.2 to 20.0.

According to a sixth aspect of the present invention, the transition metal oxide-containing cerium dioxide particles according to any one of the first to fifth aspects is provided, wherein the transition metal oxide has a molar ratio of a trivalent manganese component in the whole manganese component in the range of from 5.0 mol % to 90 mol %.

According to the oxide-containing particles of the present invention, by having a transition metal oxide to the surfaces and/or inside of the cerium dioxide particles, the oxide-containing particles can be used as a catalyst that exerts a high catalyst performance.

DETAILED DESCRIPTION OF THE PRESENT INVENTION

Figure 1:
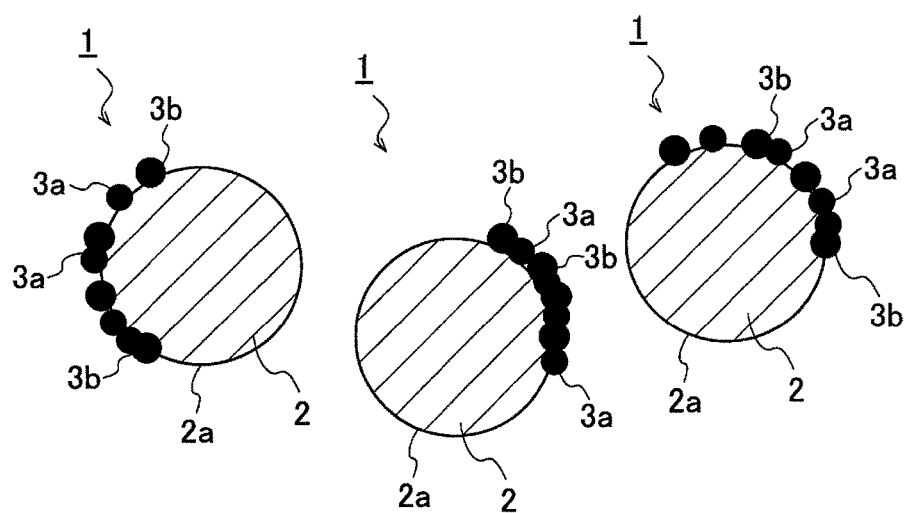
FIG. 1 is an explanation view schematically showing the structures of the oxide-containing particles of the present embodiment.

The embodiments of the present invention will be explained below with referring to the drawings. The present invention is not limited to the following embodiments, and can be modified, corrected and improved as long as the present invention does not deviate from the scope of the invention.

(1) Oxide-containing Particles (Transition Metal Oxide-containing Cerium Dioxide Particles)

As schematically shown in FIG. 1, each of the oxide-containing particles 1 of an embodiment of the present invention includes an iron oxide 3a and a manganese oxide 3b on a surface 2a and/or inside of each of cerium dioxide particles 2. The iron oxide 3a and the manganese oxide 3b correspond to the transition metal oxide in the present invention.

The average particle diameter of the particulate cerium dioxide particles 2 is not specifically limited, and can be, for example, in the range of from 0.5 μm to 10 μm. On the other hand, the iron oxide 3a and the manganese oxide 3b that are present on the surfaces 2a or the like of the cerium dioxide particles 2 are constituted by average particle diameters that are smaller than the average particle diameter of said cerium dioxide particles 2 (see the schematic drawing in FIG. 1). That is, the average particle diameters of the iron oxide 3a and the manganese oxide 3b are smaller than 0.5 μm in the above-mentioned case.

The average particle diameter of each kind of particles can be calculated, for example, by measuring the particle diameters based on a laser diffractometry. Alternatively, the average particle diameter can be determined by a well-known procedure, for example, by calculating the particle diameters of the individual particles of the cerium dioxide particles 2 and the iron oxide 3a and the manganese oxide 3b, in a visual field image observed by a scanning electron microscope (SEM) based on the size and magnification in the visual field image, and deeming the average value thereof as an average particle diameter, or the like.

According to the oxide-containing particles 1 of the present embodiment, the respective transition metal oxides (the iron oxide 3a and the manganese oxide 3b) are present in a broad distribution on the surfaces 2a or the like of the cerium dioxide particles 2. In FIG. 1, an embodiment in which the iron oxide 3a and the manganese oxide 3b are unevenly distributed on a part of the surface 2a of each cerium dioxide particle 2 so as to simplify the illustration, but the embodiment is limited to this.

At this time, the transition metal oxide such as the iron oxide 3a may be in the state that it is simply bonded to the surface 2a of the cerium dioxide particle 2, or at least a part of the transition metal oxide and the cerium dioxide particle 2 may react on the surface 2a and/or inside and be present in a solutionized state. Furthermore, the iron oxide 3a and the manganese oxide 3b may be constituted independently from each other as respective structures such as $Fe_2O_3$ and $Mn_2O_3$, or may be constituted as a structure such as $FeMnO_3$.

Meanwhile, it is known that $Fe_2O_3$ and $Mn_2O_3$ are respectively relatively stable transition metal oxides in a temperature range of from 200° C. to 800° C. Therefore, the manganese component (or the manganese oxide 3b) may be attached to a part of the iron oxide 3a of the $Fe_2O_3$ structure in a solutionized state, or the iron component (or the iron oxide 3a) may be attached to a part of the manganese oxide 3b of the $Mn_2O_3$ structure in a solutionized state. However, it is not necessary that the above-mentioned metal oxides are bonded to the cerium dioxide particle 2 by a certain chemical reaction.

By constituting the oxide-containing particle 1 by the cerium dioxide particle 2 and the iron oxide 3a and the manganese oxide 3b that are solutionized in or attached to the cerium dioxide particle 2, it becomes possible to suitably oxidize the nitrogen monoxide (NO) contained in the exhaust gas to nitrogen dioxide ($NO_2$).

As the method for allowing the transition metal oxide such as the iron oxide 3a and the like to solutionized in or attach to the surface 2a or the like of the cerium dioxide particle 2, for example, an impregnation process or the like can be used. To be specifically explained, a nitrate salt solution of a metal oxide containing an iron component and a manganese component is added to a powder of cerium dioxide particles 2 whose average particle diameter has been adjusted to be in a predetermined range in advance, and the mixture is mixed by stirring. By this way, the cerium dioxide particles 2 are put into a state that they are immersed in the nitrate salt solution of the metal oxides, and said immersed state is continued for a predetermined time. By this way, a nitrate salt solution containing an iron component or the like is adhered to the surfaces 2a.

Thereafter, the cerium dioxide particles 2 are removed from the nitrate salt solution, and the cerium dioxide particles 2 in which a part of the transition metal oxide is attached to the surfaces 2a are sintered in the air or the like. As a result, oxide-containing particles 1 in which the iron oxide 3a and the manganese oxide 3b are respectively homogeneously distributed on the surfaces 2a are formed. At this time, the content of the transition metal oxide with respect to the cerium dioxide particles 2 (in other words, the content rate of the metal oxide (the specifics will be mentioned below)) can be suitably changed by adjusting the concentration of the nitrate salt solution, and the ratio of the respective components, and the like.

Furthermore, by changing the sintering temperature of the sintering treatment that is carried out in the air or the like, the state of the transition metal oxide with respect to the cerium dioxide particles 2, that is, an adhering or coating state or a solutionized state can be changed. In addition, at this time, the crystal phase of the transition metal oxide present on the surface 2a and/or inside can also be changed.

The rate of the total transition metal oxide including the total of the iron oxide 3a and the manganese oxide 3b in the oxide-containing particles 1 of the present embodiment (the content rate of the transition metal oxide) is in the range of from 15.0% by mass to 35.0% by mass. That is, by adjusting the content rate of the metal oxides such as the iron oxide 3a to the cerium dioxide particles 2 to a predetermined ratio or more, a high catalyst performance can be exerted by the transition metal oxide. On the other hand, when the content rate of the transition metal oxide increases, the entire surfaces of the surfaces 2a of the cerium dioxide particles 2 are coated with the transition metal oxide. As a result, it is possible that the adsorption performance of the nitrogen monoxide possessed by the cerium dioxide particles 2 themselves is inhibited. Therefore, the range of the content rate of the above-mentioned metal oxide is preset with consideration for the catalyst performance by the transition metal oxide and the adsorption performance by the cerium dioxide.

The molar ratio (Fe/Mn ratio) of the iron component (iron oxide 3a) to the manganese component (manganese oxide 3b) in the transition metal oxide can be within the range of from 0.2 to 20.0. The weight ratio of the iron component to the manganese component can be arbitrary adjusted together with the crystal phase by modifying the composition ratio of the respective components of the nitrate salt solution as already indicated, which is used for allowing the cerium dioxide particles 2 to load the metal oxide, and by further changing the sintering temperature. For example, in the case of a metal oxide having a molar ratio of iron component: manganese component of from 9:1 to 2:8, the crystal structure becomes a hematite-type (Mn-solutionized $Fe_2O_3$) or a bixbite-type (Fe-solutionized $Mn_2O_3$).

Furthermore, in the transition metal oxide of the oxide-containing particles 1 of the present invention, the molar ratio of the manganese component in which the atomic value of the manganese element is 3 (trivalent manganese component ($Mn^{3+}$ component)) in the entirety of the manganese oxide 3b is defined to be within the range from 5.0 mol % to 90 mol %. In the case of the manganese element, the atomic values are bivalent, trivalent, tetravalent, hexavalent and heptavalent, of which the ratio of the $Mn^{3+}$ component is preset to be within the above-mentioned range.

By the presence of the $Mn^{3+}$ component at the above-mentioned molar ratio, the metal oxide easily has a $FeMnO_3$ structure. By this way, the mixed atomic value state containing the iron element and the manganese element makes the electronic state unstable, and thus electrons can be smoothly delivered. As a result, a high catalyst performance for purifying exhaust gas is easily exerted.

By this way, a reaction to suitably oxidize further nitrogen monoxide to nitrogen dioxide is promoted by the performance of the cerium dioxide particles 2 themselves to adsorb nitrogen monoxide, and by the metal oxide having a $FeMnO_3$ structure contained in the cerium dioxide particles 2, whereby a high performance to purify exhaust gas can be exerted. Specifically, it becomes possible to decrease the use amount of a precious metal catalyst such as platinum can be decreased more than the conventional use amounts, and to suppress the costs for constructing an exhaust gas purification system, by way of utilization of the oxide-containing particles 1 of the present invention.

(2) Embodiment of Use of Oxide-containing Particles

Figure 2:
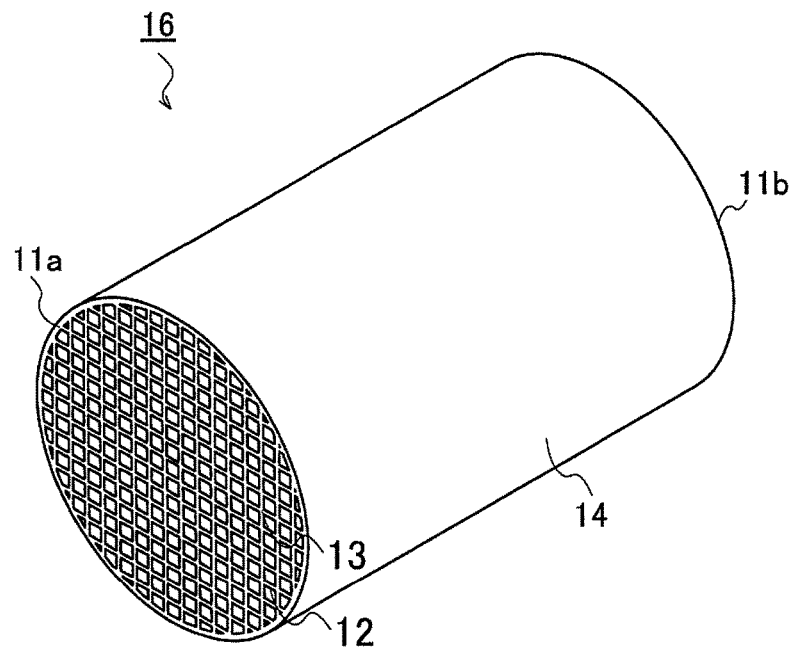
FIG. 2 is a perspective view showing an example of a honeycomb catalyst body loading the oxide-containing particles.
Figure 3:
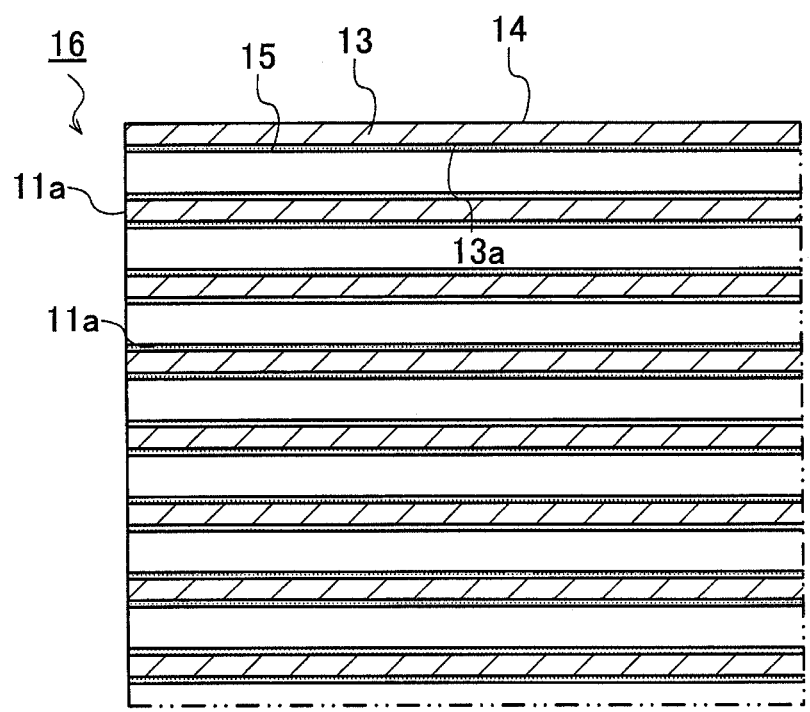
FIG. 3 is a partially-enlarged cross-sectional view showing the constitution of the honeycomb catalyst body.
Figure 4:
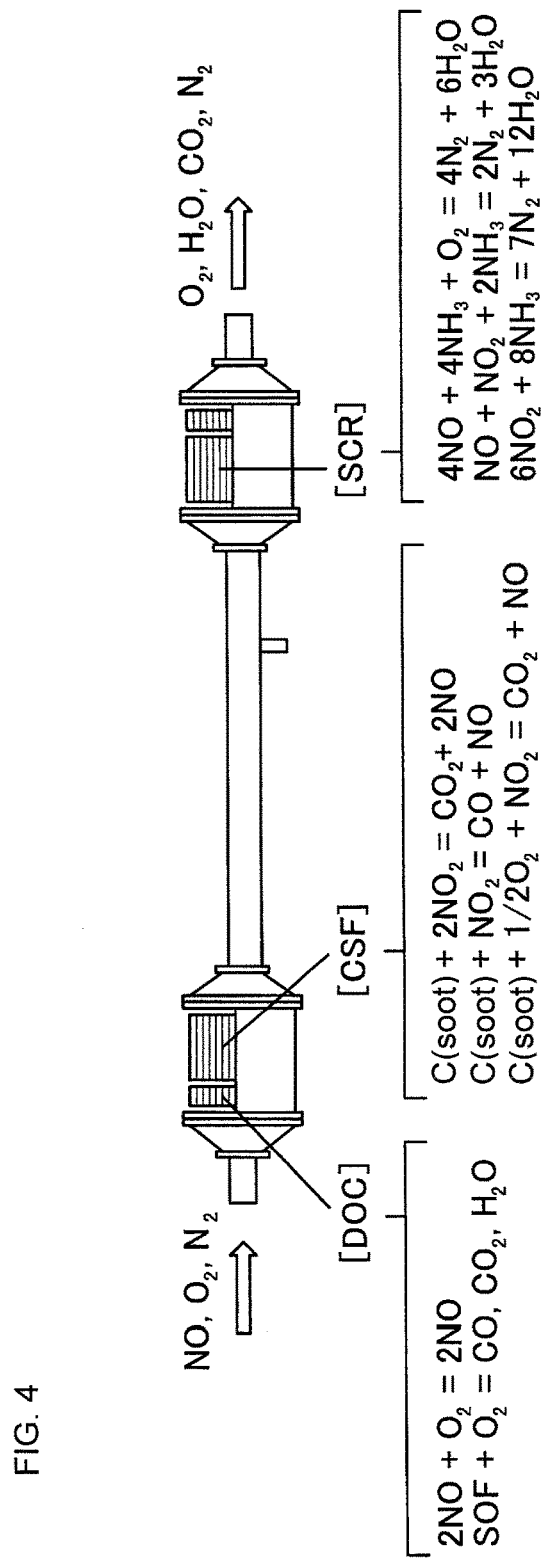
FIG. 4 is an explanation view showing the constitution of an exhaust gas purification system, and the chemical reactions that are carried out in said exhaust gas purification system.

The oxide-containing particles 1 of the present embodiment can be used as various embodiments of use. For example, the oxide-containing particles 1 can be used in a honeycomb catalyst body 16 as shown in FIGS. 2 and 3, which has a round pillar-shaped honeycomb structure 14 having partition walls 13 that define plural cells 12 that serve as flow paths for a fluid from one end face 11a to other end face 11b, as a catalyst carrier, and a surface trap layer 15 containing the oxide-containing particles 1 as a part of raw materials in partition wall surfaces 13a and the like of the partition walls 13 of said honeycomb structure 14. By this way, exhaust gas (not depicted) that has flown in the honeycomb catalyst body 16 from one end face 11a is brought into contact with the surface trap layer 15 formed on the partition wall surfaces 13a, and affected by the catalytic effect by the oxide-containing particles 1 of said surface trap layer 15. By this way, the exhaust gas is purified, and the purified gas is emitted from the other end face 11b.

In addition to the above-mentioned embodiment of use, the oxide-containing particles 1 of the present invention can be used as the embodiment of use mentioned below. Specifically, the above-mentioned oxide-containing particles 1 may be used in a part of a plugging portion (not depicted) in a sealed honeycomb structure, in which the one end face 11a and other end face 11b of the above-mentioned honeycomb structure 14 have been respectively sealed according to the disposition criteria that has been provided in advance. By this way, in the process in which treatment gas containing nitrogen monoxide passes through inside of the sealed honeycomb structure, a part of the gas is brought into contact with the plugging portions including the oxide-containing particles 1. As a result, it becomes possible to exert a catalyst performance at said parts, whereby high purify performance can be maintained.

In addition, a large-diameter honeycomb structure constituted by combining plural honeycomb segments (not depicted) each having a polygonal pillar shape such as a square pillar-shaped, which contains the oxide-containing particles 1 of the present invention as a part of raw materials for a bonding material for joining the honeycomb segments, is also acceptable. Alternatively, the oxide-containing particles 1 may also be used as a part of the raw materials for a circumferential coat material (not depicted) that coats the circumferential surface of the honeycomb structure 14.

EXAMPLES

The oxide-containing particles of the present invention will be explained below based on the following Examples, but the present invention is not limited to these Examples.

1. Preparation of Oxide-containing Particles (Sample)

Using "immersion method" that has been already explained, a transition metal oxide of an iron oxide and a manganese oxide was loaded on the surfaces of cerium dioxide particles whose average particle diameter had been adjusted to about 3 μm in advance, and the cerium dioxide particles were further subjected to a sintering treatment in the air to prepare oxide-containing particles. Meanwhile, the contents of the iron component and manganese component in the nitrate salt solution of the transition metal oxide were respectively changed, and the sintering temperature for sintering the cerium dioxide particles that had been removed from the nitrate salt solution was changed (300° C. or 700° C.). By this way, samples of the oxide-containing particles having transition metal oxides with a different crystal phase or a different composition ratio of the metal oxide on the surfaces and the like of the cerium dioxide particles (Examples 1 to 6 and Comparative Examples 1 to 4) were obtained.

Comparative Example 1 is a single body of cerium dioxide particles that do not have any transition metal oxide of an iron component and a manganese component, Comparative Example 2 is cerium dioxide particles including only an iron oxide as the transition metal oxide, and Comparative Example 3 is cerium dioxide particles including only a manganese oxide as the transition metal oxide. Therefore, the ratio of the transition metal oxide is 0% in Comparative Example 1, Furthermore, the Fe/Mn ratio is 0 in Comparative Example 3. In addition, Comparative Example 4 was obtained without using cerium dioxide particles, but by using alumina (aluminum oxide) and incorporating an iron oxide and the like therein.

2. Properties of Samples

For the samples (Examples 1 to 6 and Comparative Examples 1 to 4) of the oxide-containing particles obtained as above, the properties such as the % by mass of each component, the average particle diameter of the cerium dioxide particles, the specific surface area of the cerium dioxide particles, the specific surface area of the transition metal oxide, the measurement of the crystal phase, the crystallite sizes of the transition metal oxides ($Fe_2O_3$, $Mn_2O_3$, $FeMnO_3$), and the ratio of $Fe^{2+}$ component and $Mn^{4+}$ component were analyzed and calculated. The specific methods for the analysis and calculation of the properties are shown below.

2.1 Ratio of Each Component (% by Mass)

The % by mass of each component was calculated by analyzing based on an inductivity coupled plasma (ICP) atomic emission spectroscopy.

2.2 Crystal Phase of Particles

The crystal phase of each particle was measured by using an X-ray diffractometer (a rotating anticathode-type X-ray diffractometer: RINT manufactured by Rigaku Corporation) on the prepared sample. The conditions for the X-ray diffractometry were a CuKα source, 50 kV, 300 mA, and 2θ=10 to 60°, and the obtained X-ray diffraction data was analyzed by using commercially available X-ray data analyzing software.

The ratios of the respective components by the ICP emission spectroscopy, the sintering conditions (sintering temperature), and the crystal phases of the respective particles are summarized and shown in the following Table 1.

TABLE 1

| | Ratios of respective components/% by mass | | | | Content rate of transition metal oxide | Total | Fe/Mn ratio Molar ratio | Sintering temperature ° C. | Crystal phase of particles* | | | | |
|---|---|---|---|---|---|---|---|---|---|---|---|---|---|
| | $CeO_2$ | $Al_2O_3$ | $Fe_2O_3$ | $MnO_2$ | | | | | $CeO_2$ | $Al_2O_3$ | $Fe_2O_3$ | $Mn_2O_3$ | $FeMnO_3$ |
| Example 1 | 70.7 | — | 20.7 | 8.7 | 29.3 | 100.0 | 1.0 | 300 | ○ | — | ○ | — | — |
| Example 2 | 70.7 | — | 20.7 | 8.7 | 29.3 | 100.0 | 1.0 | 700 | ○ | — | ○ | ○ | ○ |
| Example 3 | 70.1 | — | 27.9 | 2.0 | 29.9 | 100.0 | 9.0 | 700 | ○ | — | ○ | — | — |
| Example 4 | 83.3 | — | 15.8 | 0.9 | 16.7 | 100.0 | 2.3 | 700 | ○ | — | ○ | ○ | ○ |
| Example 5 | 83.3 | — | 11.4 | 5.3 | 16.7 | 100.0 | 0.3 | 700 | ○ | — | — | ○ | — |
| Example 6 | 83.3 | — | 3.1 | 13.6 | 16.7 | 100.0 | 19.0 | 700 | ○ | — | ○ | — | — |
| Comparative Example 1 | 100.0 | — | 0.0 | 0.0 | 0.0 | 100.0 | — | 700 | ○ | — | — | — | — |
| Comparative Example 2 | 83.3 | — | 16.7 | 0.0 | 16.7 | 100.0 | — | 300 | ○ | — | ○ | — | — |
| Comparative Example 3 | 83.3 | — | 0.0 | 16.7 | 16.7 | 100.0 | 0.0 | 300 | ○ | — | — | ○ | — |
| Comparative Example 4 | — | 70.0 | 20.0 | 10.0 | 30.0 | 100.0 | — | 700 | — | ○ | ○ | ○ | ○ |

*"○" represents the presence of the particles as a crystal phase.

2.3 Specific Surface Area and Average Particle Diameter

The specific surface area of the cerium dioxide particles was measured by a well-known BET method. Furthermore, the average particle diameters of the cerium dioxide particles and the transition metal oxide were median diameters calculated by laser diffractometry.

2.4 Crystallite Size of Transition Metal Oxide

The crystallite size of the transition metal oxide was calculated based on the data obtained by the X-ray diffractometry by an X-ray diffractometer in the above-mentioned 2. 2, by applying this data to the Scherrer's equation $\tau = K\lambda/\beta\cos\theta$). In the equation, $\tau$: average size of crystallite, K: shape factor (a factor that links the size of the crystallite contained in the solid and the peak width of the diffraction pattern), $\lambda$: X-ray wavelength, $\beta$: full width at peak (radian unit), and $\theta$: Bragg angle.

2.5 Calculation of $Fe^{2+}$ Ratio and $Mn^{3+}$ Ratio

An X-ray absorption fine structure (XAFS) spectrum was measured, and an absorption near edge structure (XANES) spectrum of the XAFS spectrum was calculated by linear fitting using standard spectra. The standard spectra were the spectra of MnO, $Mn_2O_3$ and $MnO_2$ for $Mn^{2+}$, $Mn^{3+}$ and $Mn^{4+}$, respectively, and the spectra of FeO and $Fe_2O_3$ for $Fe^{2+}$ and $Fe^{3+}$, respectively.

2.6 Preparation of Samples for Measurement of $NO_2$ Conversion Rate and NO Adsorption Amount The samples (powders) of the oxide-containing particles of Examples 1 to 6 and Comparative Examples 1 to 4 obtained in the above-mentioned 1. were each subjected to monoaxial press molding at a pressure of 76 MPa. This formed body was sieved through a mesh with an opening of 3 mm, and pellets of about 1 to 2 mm were prepared. 3.00 g of the pellets were weighed, and used as a sample for measuring an $NO_2$ conversion rate. Furthermore, for the measurement of a NO adsorption amount, 0.1 g of the sample (powder) of the oxide-containing particles obtained in the above-mentioned 1. was weighed, and used as a measurement sample.

2.7 Calculation of NO Adsorption Amount

The NO adsorption amount was calculated based on a temperature rising detachment method using NO gas. As a device for calculating the NO adsorption amount, Auto-ChemII (manufactured by Micromeritis) was used. Furthermore, as the gas used for the adsorption, mixed gas of 200 ppm NO, 10% $O_2$ and He was used. The above-mentioned measurement sample was installed in a reaction tube of the temperature rising furnace, the furnace was preset so that the temperature during the gas adsorption temperature became 250° C. and the above-mentioned gas was introduced in the reaction tube. The adsorption time was 30 minutes. After the adsorption had completed, He gas was introduced into the reaction tube, and the temperature was rose from 250 to 600° C. under a condition that the temperature rising velocity had been preset to 10° C./min. The degassed component during the temperature rising was measured by a mass analyzer, and the amount of the detached NO was calculated. This amount of the detached NO was deemed as and NO adsorption amount.

2.8 Calculation of $NO_2$ Conversion Rate

Using the pellets prepared by the above-mentioned 2.6 as a measurement sample, an evaluation was conducted by using an automobile exhaust gas analyzer (SIGU1000: manufactured by HORIBA, Ltd.). At this time, glass wool was laid in the reaction tube in the temperature rising furnace, and the above-mentioned measurement sample was mounted thereon and warmed until the measurement sample reached 250° C. Furthermore, using mixed gas of 200 ppm of NO (nitrogen monoxide), 10% of $O_2$ (oxygen) and $N_2$ (nitrogen) as a reaction gas, the mixed gas was introduced in the reaction tube. At this time, the exhaust gas (outlet gas) emitted from the measurement sample was analyzed by using an exhaust gas measurement device (MEXA-6000FT: manufactured by HORIBA, Ltd.), and the respective exhaust concentrations (NO concentration and $NO_2$ concentration) were measured. Furthermore, based on the result of the measurement of the exhaust concentrations, the $NO_2$ conversion rate was obtained. The $NO_2$ conversion rate is calculated by (1−(NO concentration/(NO concentration+ $NO_2$ concentration))).

The results of the average particle diameter and specific surface area of the cerium dioxide, the specific surface area and crystallite size of the transition metal oxide, the molar ratios of $Fe^{2+}$ and the like when the transition metal oxide is deemed as 100, the molar ratios of $Fe^{2+}$ and $Fe^{3+}$ when the contained iron component (Fe) is deemed as 100, the molar ratios of $Mn^{3+}$ and $Mn^{4+}$ when the contained manganese component (Mn) is deemed as 100, the NO adsorption amount of Fe/Mn ratio (molar ratio), and the $NO_2$ conversion rate are summarized and shown in the following Table 2.

TABLE 2

| | Average particle diameter of $CeCO_2$ μm | Specific surface area of $CeO_2$ $m^2/g$ | Specific surface area of transition metal oxide $m^2/g$ | Crystallite size of transition metal oxide nm | Molar ratio of transition metal oxide*1/% | | | | Molar ratio of Fe*2/% | | Molar ratio of Mn*3/% | | Amount of adsorbed NO μmol/g | $NO_2$ conversion % |
|---|---|---|---|---|---|---|---|---|---|---|---|---|---|---|
| | | | | | $Fe^{2+}$ | $Fe^{3+}$ | $Mn^{3+}$ | $Mn^{4+}$ | $Fe^{2+}$ | $Fe^{3+}$ | $Mn^{3+}$ | $Mn^{4+}$ | | |
| Example 1 | 3 | 135 | 110 | 7.6 | 0.5 | 49.5 | 7.8 | 42.2 | 1.0 | 99.0 | 15.6 | 84.4 | 177.9 | 12.4 |
| Example 2 | 3 | 126 | 56 | 40 | 0.5 | 49.5 | 14.0 | 36.0 | 1.0 | 99.0 | 28.0 | 72.0 | 35.4 | 20.4 |
| Example 3 | 3 | 126 | 50 | 45 | 0.9 | 89.1 | 2.0 | 8.0 | 1.0 | 99.0 | 20.0 | 80.0 | 45.0 | 6.1 |
| Example 4 | 3 | 126 | 58 | 50 | 0.7 | 69.3 | 15.6 | 14.4 | 1.0 | 99.0 | 52.0 | 48.0 | 40.0 | 13.0 |
| Example 5 | 3 | 126 | 63 | 52 | 0.2 | 19.8 | 70.4 | 9.6 | 1.0 | 99.0 | 88.0 | 12.0 | 31.8 | 20.7 |
| Example 6 | 3 | 126 | 54 | 43 | 1.0 | 94.1 | 0.4 | 4.6 | 1.0 | 99.0 | 8.0 | 92.0 | 49.0 | — |
| Comparative Example 1 | 3 | 158 | 158 | — | — | — | — | — | — | — | — | — | 20.7 | 2.0 |
| Comparative Example 2 | 3 | 135 | 102 | 10 | 1 | 99 | 0 | 0 | 1.0 | 99.0 | 0.0 | 0.0 | 7.8 | 5.0 |
| Comparative Example 3 | 3 | 135 | 102 | 15 | 0 | 0 | 3 | 97 | 0.0 | 0.0 | 3.0 | 97.0 | — | 12.2 |

TABLE 2-continued

| | Average particle diameter of CeCO$_2$ μm | Specific surface area of CeO$_2$ m$^2$/g | Specific surface area of transition metal oxide m$^2$/g | Crystallite size of transition metal oxide nm | Molar ratio of transition metal oxide*[1]/% | | | | Molar ratio of Fe*[2]/% | | Molar ratio of Mn*[3]/% | | Amount of adsorbed NO μmol/g | NO$_2$ conversion % |
|---|---|---|---|---|---|---|---|---|---|---|---|---|---|---|
| | | | | | Fe$^{2+}$ | Fe$^{3+}$ | Mn$^{3+}$ | Mn$^{4+}$ | Fe$^{2+}$ | Fe$^{3+}$ | Mn$^{3+}$ | Mn$^{4+}$ | | |
| Comparative Example 4 | — | — | 80 | 30 | — | | | | — | — | — | — | — | — |

*[1]The molar ratio of each component when the transition metal oxide is deemed as 100
*[2]The molar ratio when all of the iron components (Fe) are deemed as 100
*[3]The molar ratio when all of the manganese components (Mn) are deemed as 100

As shown in the above-mentioned Tables 1 and 2, it was confirmed that a NO adsorption amount and an NO$_2$ conversion rate increase by having a transition metal oxide containing an iron component and a manganese component on the surfaces and/or inside of cerium dioxide particles. In this case, the specific surface area of the transition metal oxide becomes larger than the specific surface area of the cerium dioxide. In other word, the particle diameter of the transition metal oxide becomes smaller than the average particle diameter of the cerium dioxide.

Furthermore, a tendency that the NO$_2$ conversion rate and NO adsorption amount increase according to the increase in the molar ratio of the Mn$^{3+}$ in the case when all manganese components are deemed as 100. At this time, it was shown that the NO$_2$ conversion rate increases more when at least an iron component is incorporated (see Example 5), as compared to the case specifically when the transition metal oxide does not contain any iron component at all (see Comparative Example 3). Furthermore, it was shown that the molar ratio of Mn$^{3+}$ with respect to all manganese components decreases as the value of the Fn/Mn ratio increases.

It is generally known that, in the case when a manganese oxide contains an iron component, the manganese component and the iron component, which are transition metal components, affect their electron states each other. However, the details relating to the effect have not clarified yet, and any relationship with an NO$_2$ conversion rate and a NO adsorption amount has not been reported yet. According to the oxide-containing particles (transition metal oxide-containing cerium dioxide particles) of the present invention, by incorporating the iron component in the manganese oxide, their electron states are affected by each other. It is considered that, as a result thereof, Mn$^{3+}$ was generated and put into a mixed atomic valency state in the particles, and thus donation and reception of electrons became smooth and the NO$_2$ conversion rate and the NO adsorption amount increased. Furthermore, it can be conjectured that, since the composition range that strongly affect their electron states was a range wherein the Fe/Mn ratio was small (around 0.25), the Mn$^{3+}$ ratio increased in the vicinity of said composition range, and thus the highest properties were indicated.

By using the oxide-containing particles of the present invention, the oxide-containing particles can function as a catalyst for purifying exhaust gas emitted from an internal combustion engine such as a diesel engine, or from various combustion devices, and thus can be specifically used in purification treatments of nitrogen oxide. Specifically, the oxide-containing particles are added as a part of raw materials for sealing materials, bonding materials and circumferential coat materials, without being limited to conventional surface trap layers, and can exert a catalyst performance.

DESCRIPTION OF REFERENCE NUMERALS

1: oxide-containing particle (transition metal oxide-containing cerium dioxide particle), 2: cerium dioxide particle, 2a: surface, 3a: iron oxide (transition metal oxide), 3b: manganese oxide (transition metal oxide), 11a: one end face, 11b: other end face, 12: cell, 13: partition wall, 13a: partition wall surface, 14: honeycomb structure, 15: surface trap layer, 16: honeycomb catalyst body.

What is claimed is:

1. Transition metal oxide-containing cerium dioxide particles comprising transition metal oxide particles containing at least an iron component and a manganese component on the surfaces and/or inside of the cerium dioxide particles,
    wherein an average particle diameter of the cerium dioxide particles is in the range of from 0.5 μm to 10 μm, and an average particle diameter of the transition metal oxide particles is less than 0.5 μm.

2. The transition metal oxide-containing cerium dioxide particles according to claim 1, wherein a content rate of the transition metal oxide is particles in the range of from 15.0% by mass to 35.0% by mass.

3. The transition metal oxide-containing cerium dioxide particles according to claim 1, wherein the transition metal oxide particles are solutionized on the surface and/or inside of the cerium dioxide particle.

4. The transition metal oxide-containing cerium dioxide particles according to claim 1, wherein the molar ratio (Fe/Mn ratio) of the iron component to the manganese component in the transition metal oxide particles is in the range of from 0.2 to 20.0.

5. The transition metal oxide-containing cerium dioxide particles according to claim 1, wherein the transition metal oxide particles have a molar ratio of a trivalent manganese component in the whole manganese component in the range of from 5.0 mol % to 90 mol %.

6. The transition metal oxide-containing cerium dioxide particles according to claim 1, wherein the average particle diameter of the transition metal oxide particles is at least 7.6 nm and less than 0.5 μm.

* * * * *

UNITED STATES PATENT AND TRADEMARK OFFICE
CERTIFICATE OF CORRECTION

PATENT NO. : 10,252,248 B2
APPLICATION NO. : 15/461795
DATED : April 9, 2019
INVENTOR(S) : Yunie Izumi and Kenji Morimoto It is certified that error appears in the above-identified patent and that said Letters Patent is hereby corrected as shown below:

In the Specification

Columns 9 and 10, Table 2, Headings, Second Column:
Please change: "Average particle diameter of $CeCO_2$ µm" to -- Average particle diameter of $CeO_2$ µm --

Columns 11 and 12, Table 2-continued, Headings, Second Column:
Please change: "Average particle diameter of $CeCO_2$ µm" to -- Average particle diameter of $CeO_2$ µm --

Signed and Sealed this
Third Day of September, 2019

Andrei Iancu
*Director of the United States Patent and Trademark Office*